United States Patent [19]

Bradford et al.

[11] Patent Number: 5,952,456
[45] Date of Patent: *Sep. 14, 1999

[54] GAS PHASE PROCESS FOR THE CO-POLYMERIZATION OF CARBON MONOXIDE AND ETHYLENICALLY UNSATURATED COMPOUNDS

[75] Inventors: Arleen Marie Bradford; Andre Buys, both of Cm Amsterdam, Netherlands

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/528,831

[22] Filed: Sep. 15, 1995

[30] Foreign Application Priority Data

Sep. 15, 1994 [EP] European Pat. Off. ............... 94202654

[51] Int. Cl.$^6$ .................................................. C08G 67/02
[52] U.S. Cl. ........................... 528/392; 521/74; 502/162; 502/202; 502/207; 568/44
[58] Field of Search .............................. 528/392; 521/74; 502/202, 207, 162; 568/44

[56] References Cited

U.S. PATENT DOCUMENTS 5,175,244 12/1992 Budzelaar et al. .

FOREIGN PATENT DOCUMENTS

0508502 A2 10/1992 European Pat. Off. .
0619335 A1 10/1994 European Pat. Off. .
9001229 12/1991 Netherlands .

OTHER PUBLICATIONS

"Polymers with Main–Chain Chirality," by M. Brookhart and Mark I. Wagner, *J. Am. Chem. Soc.* 1994, 116, pp. 3641–3642.

"Palladium(II) Catalysts for Living Alternating Copolymerization of Olefins and Carbon Monoxide," by M. Brookhart, Francis C. Rix, and J. M. DeSimone, *J. Am. Chem. Soc.* 1992, 114, pp. 5894–5895.

*Primary Examiner*—Duc Truong

[57] ABSTRACT

A gas phase process for the preparation of co-polymers comprising reacting carbon monoxide and an ethylenically unsaturated compound in the presence of a catalyst system based on (a) a source of cations of a metal of Group VIII of the Periodic Table;
(b) a source of anions which comprise a plurality of boron atoms or a source of organic boron containing anions or an aluminoxane; and
(c) a source of ligands.

13 Claims, No Drawings

GAS PHASE PROCESS FOR THE CO-POLYMERIZATION OF CARBON MONOXIDE AND ETHYLENICALLY UNSATURATED COMPOUNDS

FIELD OF THE INVENTION

The invention relates to a gas phase process for the co-polymerization of carbon monoxide and ethylenically unsaturated compounds.

BACKGROUND OF THE INVENTION

The preparation of co-polymers of carbon monoxide and ethylenically unsaturated compounds, in which co-polymers the units originating from carbon monoxide alternate or substantially alternate with the units originating from the ethylenically unsaturated compounds, has been described in numerous patent publications, most of which deal with the preparation of the co-polymers in a liquid phase process.

These co-polymers can also be prepared by a gas phase process. In such a process the monomers are contacted with a catalyst composition based upon (a) a compound of a metal of Group VIII of the Periodic Table;
(b) an anion; and
(c) a bidentate ligand in the substantial absence of a liquid diluent, i.e. such that the gas phase forms the continuous phase.

Examples of such gas phase processes are known from EP-A-248483. An example of a suitable anion is the para-toluenesulphonate anion. The corresponding acid, in the exemplified case para-toluenesulphonic acid, is a suitable source of the anion.

The present Applicant has devoted a considerable amount of research towards improving the performance of the catalyst composition, for example by varying the type and the source of the anion used as catalyst component b). EP-A-508502 discloses that high activity catalysts for the gas phase process can be obtained by incorporating therein certain types of Lewis acids as component b). In EP-A-501576 the use of Lewis acid/Brönsted acid mixtures is recommended for that purpose.

The present invention provides improved catalysts for the gas phase process which comprise, as anions, anions containing a plurality of boron atoms, such as carborate anions, or organic boron containing anions, such as hydrocarbylborate anions. These anions are non- or weakly co-ordinating with the Group VIII metal and they are bulky. It is surprising that these anions give an improvement in catalyst activity in the gas phase process and an improvement in the molecular weight of the co-polymer obtained, as they fail to give improvements in liquid phase polymerizations carried out under otherwise similar conditions. It is also remarkable that neutral organic boranes, such as trihydrocarbylboranes can act as suitable source of anions. Aluminoxanes, when used as a source of anions, provide also catalyst compositions with attractive activity in the gas phase process.

Published Netherlands patent application 9001229 suggests the use of carborate anions as a catalyst component in the Group VIII metal catalyzed alternating co-polymerization of carbon monoxide with olefins. However, this document does not give any further details as regards the conditions of the use of the carborate anions and the benefits thereof. The document is concerned with liquid phase slurry polymerizations and it is entirely silent as regards gas phase processes. Brookhart et al. (J. Am. Chem. Soc. 114 (1992) p. 5894 and 116 (1994) p. 3641) have used the tetrakis [3,5-bis-(trifluoromethyl)phenyl]borate anion in combination with certain palladium/nitrogen bidentate complexes in the liquid phase synthesis of stereoregular co-polymers of carbon monoxide with styrene related olefins. EP-A-590942 discloses the use of certain aluminoxanes in Group VIII metal catalyzed liquid phase slurry polymerizations of carbon monoxide with ethene. The present favourable results are not deducible from any of these documents and are indeed surprising.

A study of the use of boron hydrocarbyl compounds as catalyst component in liquid phase copolymerizations of carbon monoxide with ethylenically unsaturated compounds is the subject matter of the earlier filed non-prepublished patent application EP-A-619335.

SUMMARY OF THE INVENTION

Accordingly, the present invention relates to a gas phase process for the preparation of co-polymers comprising reacting carbon monoxide and an ethylenically unsaturated compound in the presence of a catalyst system based on (a) a source of cations of a metal of Group VIII of the Periodic Table;
(b) a source of anions which comprise a plurality of boron atoms or a source of organic boron containing anions or an aluminoxane; and
(c) a source of ligands.

The invention also relates to a catalyst composition comprising (a) a cation of a metal of Group VIII of the Periodic Table;
(b) a boron containing anion selected from anions which contain a plurality of boron atoms and anions of the general formula $BZ_4^-$ wherein each Z independently represents a substituted or unsubstituted hydrocarbyl group, or a borane of the general formula $BZ^1{}_3$ wherein each $Z^1$ independently represents a substituted or unsubstituted hydrocarbyl group, or an aluminoxane; and
(c) a ligand selected from
(1) bidentate ligands of the general formula $$R^1R^2M^1\text{-}R\text{-}M^2R^3R^4 \qquad (I)$$

wherein $M^1$ and $M^2$ independently represent a phosphorus, arsenic or antimony atom, each of $R^1$, $R^2$, $R^3$ and $R^4$ independently represents a non-substituted or polar substituted hydrocarbyl group and R represents a divalent bridging group containing 1 to 5 carbon atoms in the bridge, (2) bidentate ligands of the general formula

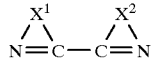

$$(II)$$

wherein $X^1$ and $X^2$ independently represent organic bridging groups each containing 3 or 4 atoms in the bridge at least 2 of which are carbon atoms, (3) bidentate ligands of the general formula $$R^5\text{S-Q-S}R^6 \qquad (III)$$

wherein $R^5$ and $R^6$ independently represent a non-substituted or polar substituted hydrocarbyl group and Q represents a bivalent bridging group containing 2 to 4 carbon atoms in the bridge, and (4) monodentate ligands of the general formula $$R^7R^8R^9M^3 \qquad (IV)$$

wherein $M^3$ represents a phosphorus, arsenic or antimony atom, $R^7$, $R^8$ and $R^9$ independently represent a non-substituted or polar substituted hydrocarbyl group.

Unsupported catalyst compositions which are based on palladium, a bidentate ligand of the general formula (II) and a tetrakis [3,5-bis(trifluoromethyl)phenyl]borate anion, as employed by Brookhart et al., and unsupported catalyst compositions which are based on a Group VIII metal, a bidentate ligand of the general formula (I) and an alkyl aluminoxane, the alkyl groups having 2–6 carbon atoms and carrying β-hydrogen atoms, as employed in EP-A-590942, are excluded from patent protection.

DETAILED DESCRIPTION

In the present specification and claims the term "metals of Group VIII of the Periodic Table" encompasses the noble metals ruthenium, rhodium, palladium, osmium, iridium and platinum, and the iron group metals iron, cobalt and nickel.

The catalyst systems, suitable for use in the process of the invention, are based, as regards (a), on a source of cations of the said metal(s).

Suitable sources of cations of metals of Group VIII include salts of mineral acids, such as salts of sulphuric acid, nitric acid and phosphoric acid, and salts of sulphonic acids, such as methanesulphonic acid and para-toluenesulphonic acid.

Preferred sources are salts of carboxylic acids, such as acetic acid, propionic acid and trifluoroacetic acid. If desired, as cation source use may be made of the metals in their elemental form, or in a zero-valent state thereof, e.g. in complex form, such as complexes wherein the Group VIII metal is covalently bonded to one or two hydrocarbyl groups. These covalently bonded hydrocarbyl groups may be aliphatic or aromatic and contain typically up to 12 carbon atoms. Preferred covalently bonded hydrocarbyl groups are aliphatic groups, in particular n-alkyl groups, such as methyl and n-butyl groups.

Catalyst systems based on a noble Group VIII metal are preferred, those based on palladium being most preferred. A preferred source of these cations is palladium (II) acetate.

According to this invention the catalyst compositions may be based, as regards (b), on anions which contain a plurality of boron atoms. The number of boron atoms is typically from 4 to 20, more typically from 8 to 16. These anions may be unsubstituted or substituted, for example halogenated. Di-negatively charged polyhedral borates can be used, such as anions of the formulae $B_{10}H_{10}^{2-}$ and $B_{12}H_{12}^{2-}$, and their halogenated analogues. It is however preferred to use a carborate anion, for example 1,2-dicarbaundecaborate and 7,8-dicarbaundecaborate, in particular an anion of the formula $B_{11}CH_{12}^-$. Such carborates are known and can be prepared by methods such as that of K. Shelly et al. (J. Am. Chem. Soc. 107 (1985) 5955).

According to this invention the catalyst compositions may also be based, as regards (b), on organic boron containing anions. Very suitable anions of this class are anions of the general formula $BZ_4^-$ wherein each Z independently represents a substituted or unsubstituted hydrocarbyl group, such as an aliphatic group or an aromatic group, such groups typically having up to 12 carbon atoms. Preferred groups Z are aryl groups which may or may not be substituted. Preferred substituents are electron withdrawing groups or atoms, such as halogen atoms, trihalomethyl groups and nitro groups. In particular the groups Z are phenyl groups, more in particular perfluorophenyl or 3,5-bis (trifluoromethyl)-phenyl groups. The four groups Z are typically identical. Preferred anions of the general formula $BZ_4^-$ are tetraphenylborate, tetrakis(perfluorophenyl)borate and tetrakis [3,5-bis(trifluoromethyl)phenyl]borate anions. Examples of suitable aliphatic groups Z are methyl, n-butyl and isobutyl groups.

Other organic boron containing anions which can be used in the catalyst system are tetra(hydrocarbyloxy)borates of the general formula

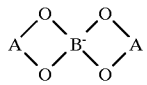

in which the bivalent groups A are independently selected from alkylene groups typically having from 2 to 6 carbon atoms, ortho-phenylene or ortho-biphenylene groups or groups of the general formula —φ—CO — wherein φ represents an ortho-phenylene group. The groups A may be substituted, e.g. with alkyl groups having suitably up to 6 carbon atoms or with halogen atoms. Such anions are known from EP-A-314309 and EP-A-391579. Preferred anions of this kind are those based on unsubstituted ortho-phenylene groups A and in particular those which can be considered to be derived from salicylic acid or 5-chloro-, 5-methyl-, 4-methyl- or 5-bromosalicylic acid.

The boron containing anions of this invention may be introduced in the catalyst composition in the form of a salt, such as a metal salt or a dialkyloxonium salt. Preferred metal salts are salts of cobalt, nickel and silver. Preferred dialkyloxonium salts are diethyloxonium salts. Very good results can be obtained with, for example, $Co[B_{11}CH_{12}]_2$, $Ni[B_{11}CH_{12}]_2$ and $Ag[B_{11}CH_{12}]$. If the anions are introduced in the form of an alkali(ne earth) metal, which metal is also present in the polymerization process, it is eligible to have in the polymerization process an ether present as an additional catalyst component, such as linear or cyclic polyalkylene polyethers, for example tetraethylene glycol or a crown ether.

The boron containing anions may suitably be introduced in the catalyst composition by reacting a neutral complex compound of the Group VIII metal, such as a dialkyl compound, with a salt of the boron containing anion and a cation capable of abstracting an anion from the Group VIII complex compound to form an anionic Group VIII complex, rendering itself neutral. An illustrative example is:

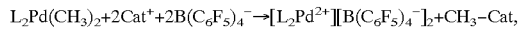

or

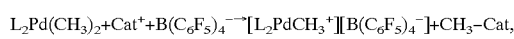

wherein [Cat⁺] is for example diphenylmethylammonium $(C_6H_5)_2CH_3NH^+$), so that [$CH_3$–Cat] becomes methane and diphenylmethylamine, and L is a complexing site (dentate group) of a ligand. In this context reference can be made to the chemistry of the Group IV metals titanium, zirconium and hafnium where this type of reactions are known to the skilled person.

It is also possible to generate boron containing anions in situ, e.g. during the polymerization, by introducing in the catalyst composition a borane of the general formula $BZ^1_3$ wherein each $Z^1$ independently represents a substituted or unsubstituted hydrocarbyl group, such as an aliphatic group or an aromatic group, such groups typically having up to 12 carbon atoms. Preferred groups $Z^1$ are aryl groups which may or may not be substituted. Preferred substituents are electron withdrawing groups or atoms, such as halogen atoms, trihalomethyl groups and nitro groups. In particular the groups $Z^1$ are phenyl groups, more in particular perfluorophenyl or 3,5-bis(trifluoromethyl)phenyl groups. The three groups $Z^1$ are typically identical. Preferred compounds of the general formula $BZ^1_3$ are triphenylborane, tris (perfluorophenyl)borane and tris [3,5-bis(trifluoromethyl) phenyl]borane. Examples of suitable aliphatic groups $Z^1$ are methyl and n-butyl groups.

The type of boron containing anion which is formed when a borane of the general formula $BZ^1_3$ is employed as a catalyst component will depend on reaction conditions selected, such as the nature of other catalyst components. Three examples may be given for illustration:

(1) When the Group VIII metal, e.g. palladium, is present as a complex compound containing covalently bonded hydrocarbyl groups, such as methyl groups, boron containing anions may, for example, be formed as follows:

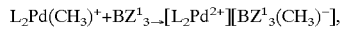

or

or

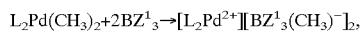

wherein L denotes a complexing site (dentate group) of a ligand and $BZ^1_3(CH_3)^{31}$ is a boron containing anion.

(2) When the Group VIII metal is present as a complex compound containing covalently bonded hydrocarbyl groups, e.g. as described under (1), and in addition there is present a compound of the general formula YXH in which X denotes oxygen or sulphur and of which the meaning of Y is explained below, such as methanol, boron containing anions may be formed via a neutral borane complex $BZ^1_3$ (YXH)$_q$ wherein q is 1, 2 or 3, in particular 1, for example as follows:

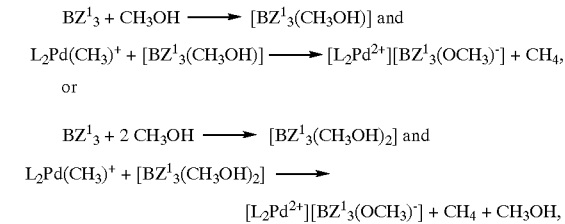

wherein $BZ^1_3(OCH_3)^-$ is a boron containing anion.

Compounds YXH may suitably be water (X is oxygen and Y is hydrogen) or an alcohol, a silanol, an oxime or a mercaptan in which cases typical structures of YXH may be set out as follows. In the case YOH is an alcohol Y typically denotes an optionally substituted aliphatic or aromatic hydrocarbyl group which may or may not be substituted and which contains typically up to 12 carbon atoms, in particular up to 6 carbon atoms. Suitable alcohols YOH are for example 2-methoxyethanol, 4-t-butyl-cyclohexanol, isopropanol, benzyl alcohol, perfluoro-hexanol and hexafluoroisopropanol. A preferred alcohol YOH is methanol. In case YOH is a silanol the group Y contains a silicon atom attached to the hydroxy group of YOH. This silicon atom may carry phenyl groups or linear or branched alkyl groups which typically have up to 12 carbon atoms, more typically up to 6 carbon atoms, and which alkyl groups may contain further silicon atoms or —SiO— groups. Examples of silanols YOH are (phenyl)(CH$_3$)$_2$SiOH, (t-C$_4$H$_9$)(CH$_3$)$_2$SiOH and ((CH$_3$)$_3$SiO)$_3$SiOH. In the case YOH denotes an oxime, it is a condensation product of hydroxylamine with an aldehyde (in which case it may be a cis or a trans oxime), not formaldehyde, or a ketone. Such aldehydes and ketones may be aliphatic or aromatic and contain typically up to 12 carbon atoms, more typically up to 6 carbon atoms. Very suitable are, for example, cyclohexanone oxime and acetone oxime. In the case YSH denotes a mercaptan the group Y is typically specified as an optionally substituted aliphatic or aromatic hydrocarbyl group which may be substituted and which contains typically more than 6 carbon atoms, in view of an objectionable odour of the mercaptan, and in particular up to 25 carbon atoms. Suitable mercaptans YSH are, for example, 4-t-butylcyclohexyl mercaptan, para-octylbenzyl mercaptan and octadecyl mercaptan. (3) When there is present a compound of the general formula YXH, as defined hereinbefore, for example methanol, and in addition there is present a base, boron containing anions may be formed via a neutral borane complex $BZ^1_3$(YXH)$_q$, as described hereinbefore, for example as follows:

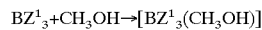

and

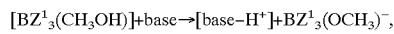

or

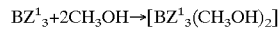

and

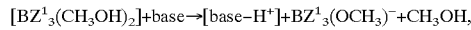

wherein $BZ^1_3$ $(OCH_3)^-$ is a boron containing anion.

Suitable bases which are capable of abstracting a proton from the complex $BZ^1_3$ (YXH)$_q$ are tertiary amines or tertiary phosphines, such as trihydrocarbylamines and -phosphines of which the hydrocarbyl groups contain typically up to 12 carbon atoms and which are preferably aliphatic groups. Preferably these hydrocarbyl groups are identical. Suitable tertiary amines and phosphines are for example triethylamine, N,N-dimethylaniline and tri-n-butylphosphine. Other suitable bases are carboxylate anions, typically anions of carboxylic acids having a pKa of more than 2, preferably from 4–10 (when measured in water at 18° C.), in particular of acids which comprise up to 12 carbon atoms and which are aromatic or aliphatic. The carboxylate anions are typically anions of fatty acids. Examples of suitable carboxylate anions are acetate, propionate, pivaloate and para-methyl-benzoate anions. Other suitable bases may be inorganic, such as anions of phosphoric acid, for example dihydrogenphosphate and phosphate anions. The quantity of the compound YXH and the base which may be used in the catalyst composition may vary between wide limits. However, it is preferred that the molar ratio of the compound YXH and borane $BZ^1_3$ is from 1:10 to 10:1, in particular from 1:5 to 5:1, more in particular from 1:2 to 2:1. The quantity of base in equivalents relative to the quantity of borane $BZ^1_3$ in moles is in the range of from 1:10 to 10:1, in particular from 1:5 to 5:1, more in particular from 1:2 to 2:1.

The amount of the boron containing anions which is present in the catalyst composition of this invention is not critical. Typically they are used in an amount of 0.5 to 200, preferably of 1.0 to 50, more preferably 1.0 to 10 equivalents per gram atom of Group VIII metal.

It is possible to isolate the catalyst composition as a complex compound which, for example, does not contain a metal cation introduced together with the boron containing anion and to use the isolated complex in the process of this invention. However, when the Group VIII metal is a noble metal the presence of cations of cobalt, nickel, manganese, lead, zinc, magnesium, iron (II), copper (II), lanthanum or neodymium in the gas phase process may have an advantageous effect on the catalyst activity which is additional to the effect of the presence of the boron containing anions. Hence, it is advantageous to apply in the invented process a catalyst composition which is based on, as an additional component, a source of cations selected from cobalt, nickel, manganese, lead, zinc, magnesium, iron (II), copper (II), lanthanum or neodymium, preferably selected from cobalt, nickel, manganese, lead, zinc, magnesium and iron (II), and most preferably selected from cobalt, nickel and manganese. Said metal cations are preferably present in a quantity of 1.0 to 50 gram atom, in particular 1.0 to 10 gram atom per gram atom of Group VIII metal.

As regards (b) the catalyst compositions may comprise an aluminoxane. Aluminoxanes, or alumoxanes, are well known in the art. They are typically prepared by controlled hydrolysis of aluminium alkyls. Preferably aluminoxanes are used which contain on average 2–10, in particular 3–5, aluminium atoms per molecule.

Attractive results in the gas phase polymerization process can be obtained with methyl aluminoxanes. Other preferred aluminoxanes are alkyl aluminoxanes, in which the alkyl groups have 2–6 carbon atoms and carry β-hydrogen atoms, in particular t-butyl groups. In particular the latter are known from M. R. Mason et al. (J. Am. Chem. Soc. 115 (1993) 4971).

The quantity of aluminoxanes which can be used may vary between wide limits. They are preferably used in a quantity which contains per gram atom of Group VIII metal 10–4,000 gram atom aluminium, more preferably 100–2,000 gram atom aluminium.

As regards (c), the catalyst system of the invented process is based on a source of ligands. It would appear that the presence of two complexing sites in one ligand molecule significantly contributes to the formation of stable catalysts. It is thus preferred to use a ligand containing at least two dentate groups which can complex with the Group VIII metal. Although less preferred, it is also possible to employ a monodentate ligand, i.e. a compound which contains a single dentate group which can complex with the Group VIII metal. Suitably a bidentate ligand is used which contains two phosphorus-, nitrogen- or sulphur containing dentate groups. It is also possible to use a bidentate mixed ligand such as 1-diphenylphosphino-3-ethylthiopropane.

A preferred group of bidentate ligands can be indicated by the general formula $$R^1R^2M^1\text{-}R\text{-}M^2R^3R^4 \tag{I}$$

In this formula $M^1$ and $M^2$ independently represent a phosphorus, arsenic or antimony atom, $R^1$, $R^2$, $R^3$ and $R^4$ independently represent a non-substituted or polar substituted hydrocarbyl group, in particular of up to 10 carbon atoms, and R represents a divalent organic bridging group containing 1 to 5 atoms in the bridge.

In the ligands of formula (I) $M^1$ and $M^2$ preferably represent phosphorus atoms. $R^1$, $R^2$, $R^3$ and $R^4$ may independently represent optionally polar substituted alkyl, aryl, alkaryl, aralkyl or cycloalkyl groups. Preferably at least one of $R^1$, $R^2$, $R^3$ and $R^4$ represents an aromatic group, in particular an aromatic group substituted by polar groups.

Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

If one or more of $R^1$, $R^2$, $R^3$ and $R^4$ represents a substituted aryl group, preference is given to a phenyl group substituted at one or both ortho positions with respect to $M^1$ or $M^2$, with an alkoxy group, preferably a methoxy group.

In the ligands of formula (I), R preferably represents a divalent organic bridging group containing from 2 to 4 bridging atoms, at least two of which are carbon atoms.

Examples of suitable groups R are: —$CH_2$—$CH_2$—$CH_2$—, —$CH_2$—$Si(CH_3)_2$—$CH_2$—, —$CH_2$—$C(CH_3)_2$—$CH_2$—, and —$CH_2$—$CH_2$—$CH_2$—$CH_2$—. Preferably R is a trimethylene group.

Other suitable bidentate ligands are nitrogen containing compounds of the general formula

(II)

wherein $X^1$ and $X^2$ independently represent organic bridging groups each containing 3 or 4 atoms in the bridge at least 2 of which are carbon atoms. There may be an additional bridging group connecting the bridging groups $X^1$ and $X^2$. Examples of such compounds are 2,2'-bipyridine, 4,4'-dimethyl-2,2'-bipyridine, 4,4'-di-methoxy-2,2'-bipyridine, 1,10-phenanthroline, 4,7-diphenyl-1,10-phenanthroline and 4,7-dimethyl-1,10-phenanthroline. Preferred compounds are 2,2'-bipyridine and 1,10-phenanthroline.

Again other suitable bidentate ligands are sulphur containing compounds of the general formula $$R^5S\text{-}Q\text{-}SR^6 \tag{III}$$

wherein $R^5$ and $R^6$ independently represent a non-substituted or polar substituted hydrocarbyl group and Q represents a bivalent bridging group containing 2 to 4 carbon atoms in the bridge. The groups $R^5$ and $R^6$ are preferably alkyl groups, each having in particular up to 10 carbon atoms. Very suitable bis thio compounds are 1,2-bis (ethylthio)ethane and 1,2-bis(propylthio)ethene.

It is preferred to use as a monodentate ligand a compound of the general formula $$R^7R^8R^9M^3 \tag{IV}$$

wherein $M^3$ represents a phosphorus, arsenic or antimony atom, each of $R^7$, $R^8$ and $R^9$ independently represents a non-substituted or polar substituted hydrocarbyl group, such as n-alkyl groups and aryl groups, in particular phenyl groups. Eligible substituents are alkoxy groups, in particular having up to 5 carbon atoms, such as methoxy and ethoxy groups. Preferred monodentate ligands are tris(o-tolyl)phosphine, tris(o-methoxyphenyl)phosphine, trinaphthylphosphine and tris(n-butyl)phosphine.

The amount of bidentate ligand supplied may vary considerably, but is usually dependent on the amount of metal of Group VIII, present in the catalyst system. Preferred amounts of bidentate ligands are in the range of 0.5 to 8, preferably in the range of 0.5 to 2 moles per gram atom of metal of Group VIII, unless the bidentate ligand is a nitrogen bidentate ligand, in which case the bidentate ligand is preferably present in an amount of from 0.5–200 and in particular 1–50 moles per gram atom of metal of Group VIII. The monodentate ligands are preferably present in an amount of from 0.5–50 and in particular 1–25 moles per gram atom of metal of Group VIII.

The stability of the catalyst system may be increased by incorporating a promoter therein. Suitably, an organic oxidant promoter is used, such as a quinone. Preferred promoters are selected from the group consisting of benzoquinone, naphthoquinone and anthraquinone. The amount of promoter is advantageously in the range of 1–50, preferably in the range of 1–10 mole per gram atom of metal of Group VIII. The catalyst activity can also be maintained at a high level by feeding (further) organic oxidant during the polymerization, at a constant or varying rate or intermittently.

Preferably in the process of the invention use is made of a catalyst system, supported on a solid carrier, usually in order to facilitate the introduction of the catalyst system into the reactor. The invention also relates to these supported catalysts compositions.

Suitable carrier materials may be inorganic, such as silica, alumina or charcoal, or organic such as cellulose or dextrose. Furthermore a polymer material may be used as carrier, such as polyethene, polypropene or a co-polymer such as a co-polymer of carbon monoxide with an ethylenically unsaturated compound, for example linear alternating co-polymers of carbon monoxide with ethene or carbon monoxide with ethene and propene or butene-1. When as regards (b) an aluminoxane is used it may be attractive to employ commercially available supported aluminoxane, for example methyl aluminoxane on silica.

The quantity of catalyst composition relative to the quantity of carrier may vary between wide limits. Preferred supported catalysts contain from 0.0002–0.001 gram atom of metal of Group VIII per kg of carrier material, in particular 0.00005–0.005 gram atom of metal of Group VIII per kg of carrier material, more in particular 0.00001–0.010 gram atom of metal of Group VIII per kg of carrier material.

Conveniently the carrier is impregnated with a solution of the catalyst system in a suitable solvent or liquid diluent. It will be appreciated that the amount of solvent or liquid diluent used is relatively small, so that any excess thereof can easily be removed before or during the initial stage of the co-polymerization process. On the other hand it has been observed, that the presence of a minor amount of liquid during the process has a delaying effect on the deactivation rate of the catalyst system, the quantity of liquid being so small that the gas phase is the continuous phase during the polymerization. The quantity of liquid is in particular selected such that it is 20–80% by weight, more in particular 40–60% by weight, of the quantity which is sufficient to saturate the gas phase under the conditions of the polymerization. Polar solvents are preferred, such as lower alcohols, for example methanol and ethanol, ethers such as diethylether or the dimethylether of diethylene glycol (diglyme) and ketones such as acetone and methylethylketone. An apolar solvent, such as toluene, may also be used or the co-polymerization may advantageously be carried out in the absence of a solvent, in particular, when the catalyst composition comprises a Group VIII metal which is covalently bonded with a single hydrocarbyl or acyl group, such as in $[L_2PdCH_3^+][B(C_6F_5)_4^-]$ or $[L_2PdCOCH_3^+][B(C_6F_5)_4^-]$, in which L represents a dentate group.

The amount of catalyst used in the process of the invention may vary between wide limits. Recommended amounts are in the range of $10^{-8}$ to $10^{-2}$, calculated as gram atoms of metal of Group VIII, per mole of ethylenically unsaturated compound to be co-polymerized with carbon monoxide. Preferred amounts are in the range of $10^{-7}$ to $10^{-3}$ on the same basis.

Ethylenically unsaturated compounds suitably to be used as monomers in the co-polymerization process of the invention, include compounds consisting exclusively of carbon and hydrogen and compounds which in addition comprise hetero atoms, such as unsaturated esters. Unsaturated hydrocarbons are preferred. Examples of suitable monomers are lower α-olefins, i.e. olefins containing from 2 to 6 carbon atoms, such as ethene, propene and butene-1, cyclic olefins such as cyclopentene, aromatic compounds, such as styrene and alpha-methylstyrene and vinyl esters, such as vinyl acetate and vinyl propionate. Preference is given to ethene and mixtures of ethene with another α-olefin, such as propene or butene-1.

Generally, the molar ratio between on the one hand carbon monoxide and on the other hand the ethylenically unsaturated compound(s), is selected in the range of 1:5 to 5:1. Preferably the molar ratio is in the range of 1.5:1 to 1:1.5, substantially equimolar ratios being preferred most.

The co-polymerization process is usually carried out at a temperature between 20 and 200° C., preferably at a temperature in the range of 30 to 150° C. The reaction is conveniently performed at a pressure between 2 and 200 bar, pressures in the range of 20 to 100 bar being preferred.

The co-polymers obtained according to the invention are suitable as thermoplastics for fibres, films or sheets, or for injection moulding, compression moulding and blowing applications. They may be used for applications in the car industry, for the manufacture of packaging materials for food and drinks and for various uses in the domestic sphere.

The invention will be illustrated by the following examples.

EXAMPLE 1

Gas phase co-polymerization of carbon monoxide and ethene.

A catalyst solution was prepared as follows: 57.4 mg (0.11 mmole) of 1,3-bis[bis(ortho-methoxy-phenyl)phosphino] propane was dissolved in 2.5 ml of tetrahydrofuran. After complete dissolution, the solution was added to 22.0 mg (0.10 mmole) of palladium (II) acetate. Subsequently 17.5 ml of methanol was added and the mixture was stirred during 1 hour, to form a clear light brown solution. Subsequently 84.5 mg (0.25 mmole) of purchased cobalt carborate $(Co[B_{11}CH_{12}]_2)$ and 33.4 mg (0.22 mmole) of naphthoquinone (33.4 mg) was dissolved. Of this solution 2.0 ml was taken and diluted with 2.0 ml of methanol.

Of the resulting 4.0 ml of diluted catalyst solution 1 ml was charged to a 0.5 l autoclave, together with 8 gram of a dried, previously prepared terpolymer of carbon monoxide, ethene and propene. The autoclave was equipped with a fixed stirring device and an automatic pressure relief.

Subsequently, the reactor was closed and pressurized at 50 bar with nitrogen. The pressure was released and the autoclave was purged twice with carbon monoxide, (6 bar), after which it was pressurized with carbon monoxide (24 bar) and ethene (24 bar).

The contents of the reactor were heated to 90° C. The supply of carbon monoxide/ethene feed (molar ratio 1:1) was started to maintain the pressure at 50 bar absolute.

A solution of 111.3 mg of naphthoquinone in 100 ml of methanol was added at a rate of 2.0 ml/mg palladium and per hour, starting 0.5 hour after the beginning of the reaction (defined as the moment that the temperature of the reaction mixture reached 60° C.)

The co-polymerization reaction was stopped by automatic pressure relief after a reaction period of 5 hours. The product was recovered, dried overnight in a vacuum oven under a nitrogen purge at 50° C. and weighed.

The average polymerization rate was 18.3 kg co-polymer/(g palladium.hour). The intrinsic viscosity (Limiting Viscosity Number, LVN) of the co-polymer obtained was 2.2 dl/g, calculated from determined viscosity values, measured for different co-polymer concentrations in m-cresol at 60° C.

EXAMPLE 2

Example 1 was repeated with the difference that, instead of cobalt carborate, 0.25 mmole purchased silver carborate ($Ag[B_{11}CH_{12}]$) was used.

The average polymerization rate was 14.6 kg co-polymer/(g palladium.hour). The LVN of the co-polymer obtained was 2.5 dl/g.

EXAMPLE 3

Example 1 is repeated with the difference that, instead of cobalt carborate, 0.25 mmole of nickel carborate (Ni $[B_{11}CH_{12}]_2$ is used.

The result is virtually the same as obtained in Example 1.

EXAMPLE 4 (for comparison)

Example 1 is repeated with the difference that, instead of cobalt carborate, 0.5 mmole of para-toluenesulphonic acid is used.

The average polymerization rate is between 3 and 4 kg co-polymer/(g palladium.hour). The LVN of the co-polymer obtained is approximately 2 dl/g.

EXAMPLE 5

Example 1 was repeated with the differences (1) that 0.10 mmole of cobalt carborate instead of 0.25 mmole was used, (2) that 0.10 mmole palladium chloride instead of palladium acetate was used and (3) that prior to the addition of the naphthoquinone the solution is filtered.

The average polymerization rate was 16.9 kg co-polymer/(g palladium.hour). The LVN of the co-polymer obtained was 2.8 dl/g.

EXAMPLE 6

Example 1 was repeated with the difference that 0.5 mmole of tris(perfluorophenyl)borane instead of cobalt carborate was used.

The average polymerization rate was 8.4 kg co-polymer/(g palladium.hour). The LVN of the co-polymer obtained was 3.0 dl/g.

EXAMPLE 7 (for comparison)

Liquid phase co-polymerization of carbon monoxide and ethene.

A catalyst solution was prepared as follows: 57.4 mg (0.11 mmole) of 1,3-bis[bis(ortho-methoxy-phenyl)phosphino] propane was dissolved in 2.5 ml of tetrahydrofuran. After complete dissolution, the solution was added to 22.0 mg (0.10 mmole) of palladium (II) acetate. Subsequently 17.5 ml of methanol was added and the mixture was stirred during 1 hour, to form a clear light brown solution. Subsequently 84.5 mg (0.25 mmole) of purchased cobalt carborate ($Co[B_{11}CH_{12}]_2$) was dissolved in the solution.

Of the resulting catalyst solution 1 ml was charged to a 0.3 l autoclave, together with 170 ml methanol and 2.7 gram of a dried, previously prepared terpolymer of carbon monoxide, ethene and propene.

Subsequently, the reactor was closed and pressurized at 50 bar with nitrogen. The pressure was released and the autoclave was purged twice with carbon monoxide, (6 bar), after which it was pressurized with carbon monoxide (25 bar) and ethene (25 bar).

The contents of the reactor were heated to 90° C. The supply of carbon monoxide/ethene feed (molar ratio 1:1) was started to maintain the pressure at 50 bar absolute.

The co-polymerization reaction was stopped by pressure relief after a reaction period of 5 hours. The product was recovered, dried overnight in a vacuum oven under a nitrogen purge at 50° C. and weighed.

The average polymerization rate was 6.1 kg co-polymer/(g palladium.hour). The LVN of the co-polymer obtained was 1.4 dl/g.

EXAMPLE 8 (for comparison)

Example 7 was repeated with the difference that, instead of cobalt carborate, 0.5 mmole of trifluoroacetic acid was used.

The average polymerization rate was 7.1 kg co-polymer/(g palladium.hour). The LVN of the co-polymer obtained was 1.5 dl/g.

EXAMPLE 9 (for comparison)

Example 7 is repeated with the difference that, instead of cobalt carborate, 0.5 mmole of para-toluene-sulphonic acid is used.

The average polymerization rate is about 6 kg co-polymer/(g palladium.hour). The LVN of the co-polymer obtained is about 1.5 dl/g.

Examples 1–3, 5 and 6 show that in the gas phase process an improved average polymerization rate and a higher LVN of the prepared polymer, reflecting an improved, higher molecular weight, can be obtained by using an anion according to this invention, as compared with a gas phase process in which para-toluenesulphonate anions are used (Example 4). In Examples 1–3 cations of cobalt, silver and nickel were present as well. In Example 5 cations of cobalt were removed before the polymerization was carried out. Example 7 shows that in the slurry phase polymerizations the carborate anion of the formula $B_{11}CH_{12}^-$ did not give an improvement of the polymerization rate and LVN, compared with the use of para-toluenesulphonate and trifluoroacetate anions (Examples 8 and 9).

$^{13}$C-NMR analysis showed that the polymers obtained in Examples 1–9 had linear chains in which the monomer units originating in carbon monoxide and the monomer units originating in ethene were arranged in an alternating order.

We claim as our invention:

1. A gas phase process for the preparation of co-polymers comprising reacting carbon monoxide and one or more ethylenically unsaturated compounds in the presence of a catalyst system comprising:
    (a) a source of cations of one or more noble metals of Group VIII of the Periodic Table;

(b) a boron containing anion selected from the group consisting of anions containing a plurality of boron atoms and carborates; and (c) a source of ligands.

2. The process of claim 1 wherein said boron containing anion is selected from the group consisting of tetraphenylborate, tetrakis(perfluorophenyl)borate and tetrakis[3,5-bis(trifluoromethyl)phenyl] borate anions.

3. The process of claim 1 wherein said source of cations is a salt of palladium and a carboxylic acid, said source of ligands is a bidentate ligand of the general formula $$R^1R^2M^1\text{-}R\text{-}M^2R^3R^4 \qquad (I)$$

wherein $M^1$ and $M^2$ represent phosphorus atoms, each of $R^1$, $R^2$, $R^3$ and $R^4$ independently represents a non-substituted or polar substituted aryl group and R represents a bivalent bridging group containing 2 to 4 carbon atoms in the bridge.

4. The process of claim 3 wherein each of $R^1$, $R^2$, $R^3$ and $R^4$ represents an ortho-alkoxyphenyl group and R represents a trimethylene group.

5. The process of claim 1 comprising between about 1.0 and 50 equivalents of boron anions and between about 0.5 and 8 moles of bidentate ligand, all quantities being defined per gram atom of Group VIII noble metal.

6. The process of claim 1 comprising between about 100 and 2000 gram atoms of aluminumand between about 0.5 and 8 moles of bidentate ligand, all quantities being defined per gram atom of Group VIII noble metal.

7. The process of claim 1 wherein said source of cations comprises a member of the group of metals consisting of cobalt, nickel, manganese, lead, zinc, magnesium, iron (II), copper (II), lanthanum, neodymium and mixtures thereof.

8. The process of claim 7 wherein said cation sources comprises a member of the group consisting of cobalt, nickel and manganese.

9. The process of claim 7 wherein said metals are present in a quantity of 1.0 to 10 gram atom per gram atom of Group VIII noble metal.

10. The process of claim 1 wherein said Group VIII metal is covalently bonded with a single hydrocarbyl or acyl group.

11. The process of claim 1 further comprising a promoter selected from the group consisting of benzoquinone, naphthoquinone or anthraquinone, in a quantity of 1 to 50 mol per gram atom of Group VIII noble metal.

12. The process of claim 1 wherein said catalyst system is supported on a carrier comprising a copolymer of carbon monoxide with one or more ethylenically unsaturated compounds.

13. The process of claim 1 wherein as ethylenically unsaturated compound ethene or a mixture of ethene with propene or ethene with 1-butene is used, the reaction is carried out at a temperature in the range of 30 to 150 C. and at a pressure in the range of 20 to 100 bar.

* * * * *